United States Patent [19]

Massol et al.

[11] Patent Number: 4,461,840

[45] Date of Patent: Jul. 24, 1984

[54] HEAT RESISTANT GLASS FIBER COMPOSITION

[76] Inventors: Jean-Jacques Massol, 23 bis, rue Bokanowski, F92600 Asnieres; Daniel Sainte-Foi, St. Germer, 56 rue Maurice Duchemin, 60600 Clermont, both of France

[21] Appl. No.: 399,317

[22] Filed: Jul. 19, 1982

[30] Foreign Application Priority Data

Jul. 20, 1981 [FR] France .................... 81 14060
Feb. 3, 1982 [FR] France .................... 82 01695

[51] Int. Cl.$^3$ ............................................. C03C 13/00
[52] U.S. Cl. ........................................ 501/36; 501/70; 501/73
[58] Field of Search ................ 501/70, 73, 35, 36, 501/95

[56] References Cited

U.S. PATENT DOCUMENTS

| | | | |
|---|---|---|---|
| 3,736,162 | 5/1973 | Chvalovsky et al. | 501/35 |
| 3,799,836 | 3/1974 | Rogers et al. | 501/70 |
| 3,900,329 | 8/1975 | Grubb et al. | 501/70 |
| 4,365,984 | 12/1982 | Gee | 501/36 |

FOREIGN PATENT DOCUMENTS

| | | |
|---|---|---|
| 1356354 | 2/1964 | France . |
| 2318832 | 2/1977 | France . |
| 53-56207 | 5/1978 | Japan . |
| 458522 | 1/1975 | U.S.S.R. .................... 501/35 |

OTHER PUBLICATIONS

Chemical Abstracts, vol. 89, 1978, Ref. No. 184615w, p. 285–Columbus, Ohio (US), & JP-A-78 56 207, (Nippon Sheet Glass Co., Ltd.), (May 22, 1978).

Chemical Abstracts, vol. 88, 1978, Ref. No. 77981v, p. 246–Columbus, Ohio (US), & SU-A-581 104, (V. B. Zaporozhets et al.), (Nov. 25, 1977).

*Primary Examiner*—Helen M. McCarthy
*Attorney, Agent, or Firm*—John T. Synnestvedt; Kenneth P. Synnestvedt

[57] ABSTRACT

The present invention concerns glass compositions capable of being attenuated in the form of fibers.

These glass fibers comprise the following oxides in the percentages by weight: $SiO_2$:37 to 48%; $Al_2O_3$:17 to 25%; CaO:23 to 33%; MgO:0.1 to 7%; $Fe_2O_3$:0.1 to 3%; $Na_2O$:2 to 8%; $K_2O$:0.1 to 7%, the sum of the percentages of earthalkaline oxides (CaO and MgO) being less than or equal to 34%, and the sum of the alkaline oxides ($Na_2O$ and $K_2O$) being greater than 5%.

The invention is applicable to the manufacture of products subjected to elevated temperatures, for instance, products used for insulation purposes, even when such products may be subjected to a temperature as high as 700° C.

4 Claims, No Drawings

HEAT RESISTANT GLASS FIBER COMPOSITION

The present invention concerns glass compositions capable of being fiberized, particularly by the action of fluids under pressure.

More specifically, the object of the invention is glass compositions capable of being attenuated in the form of fibers, particularly discontinuous fibers produced by the action of a fluid on glass streams issuing from a multiplicity of orifices.

The glass compositions currently utilized for the production of discontinuous fibers are resultant of a compromise between the desired properties of the said fibers and the constraints imposed by the industrial fiberizing processes. The most commonly used process consists of feeding molten glass into a hollow body or spinner which rotates at high speed. This body has a peripheral wall perforated with a multiplicty of orifices through which the glass is projected horizontally by centrifugal force. Primary fibers are thus formed which are then attenuated by the action of a burner or a gaseous current projected downwardly at the periphery of the spinner. The nature of the material utilized in the manufacture of the hollow body requires glass compositions having characteristics which enable fiberization at temperatures lower than 1200° C.

Compositions of this type are described in particular in U.S. Pat. No. 3,853,569.

The fibers obtained from these traditional glass compositions are utilized to produce numerous insulation products which give good results when they are subjected to relatively low temperatures, preferably not appreciably exceeding 400° C. Above 450° C., these products are degraded fairly rapidly following a structural modification of the glass composition which is clearly evidenced by a more or less pronounced collapse of the said products causing in particular a significant decrease in their insulation properties.

The attainment of heat-resistant products which would have improved resistance to collapse following exposure to heat necessarily eliminates the possibility of use of glass compositions which begin to soften at temperatures higher than that of the traditional glass compositions.

Certain solutions have already been contemplated, such as the use of glass compositions prepared from basalt rock or those reproducing the composition of this natural product. These glass compositions are normally fiberized by methods such as those utilizing the centrifugation of the molten glass layered on a wheel rotating at high speed, or the attenuation by fluid of glass streams issuing from a bushing made from a platinum alloy.

These basalt glass compositions which are more resistant to elevated temperatures effectively have transformation temperatures $T_g$ (which substantially correspond to a viscosity $\eta$ expressed in poises, or in deciPascalseconds, such as log $\eta = 13$) of at least 650° C. whereas the transformation temperature is only about 540° C. for the traditional glass compositions (Pascals: $10^5$ Pascals = 1 bar).

However, these basalt glass compositions have a high content of iron oxides, often greater than 8% by weight, which has its disadvantages. It is known that the preparation of these glass compositions, effected in electric ovens equipped with molybdenum, causes accelerated wear of the said electrodes. It is also known that the glass compositions having a high iron content are difficult to make uniform in temperature, and, therefore, in viscosity, which affects the fiberization by the formation of a greater number of defects known as glass "beads".

The object of the present invention is the provision of glass fiber compositions having a higher transformation temperature $T_g$ and relatively lower temperatures at the viscosity utilizable in process of fiberizing, without presenting the disadvantages of the known glass compositions.

The object of the present invention is also the provision of glass fiber compositions which present both relatively low temperatures at the viscosities utilizable in the process for fiberizing and a sufficiently large variation between the liquidus temperature and the temperatures used for fiberization.

The following detailed description will set forth the characteristics and advantages of these compositions.

The invention essentially consists of glasses in fiber form, the composition of which comprises the following oxides in the percentages indicated by weight:

| | |
|---|---|
| $SiO_2$ | 37 to 48% |
| $Al_2O_3$ | 17 to 25% |
| CaO | 23 to 33% |
| MgO | 0.1 to 7% |
| $Fe_2O_3$ | 0.1 to 3% |
| $Na_2O$ | 2 to 8% |
| $K_2O$ | 0.1 to 7% |
| Impurities | <3% |

The sum of the system of formative oxide content, namely silica and alumina, must be maintained between 55 and 65% by weight. This enables the attainment of glass compositions of which the content of formative oxides is high enough to assure a good fiberizing capability without too greatly increasing the viscosity. In this context, the elevation of the temperatures corresponding to the very high viscosities, $T_g$ is obtained by maintaining the $Al_2O_3/SiO_2$ ratio preferably above 0.4.

The sum of the earth-alkaline oxides, represented mostly by the lime, must be maintained between 24 and 34%. Below 24%, the temperature $T_g$ begins to decrease substantially; above 34%, the variation between the fiberizing temperature and the liquidus temperature is then too low to obtain good fiberizing conditions. The lime content is maintained at a value less than or equal to 33% since, above that amount, the corrosive action of this oxide becomes too strong, particularly on the refractory materials forming the walls of glass melting furnaces.

With regard to basalt glass compositions, the incorporation of a high content of earth-alkaline oxides enables both the attainment of substantially equal temperatures corresponding to the fiberizing field and the maintenance of the temperatures corresponding to the higher viscosities, particularly $T_g$.

In the glass compositions according to the invention, when the quantity of magnesia is increased and the quantity of lime decreased, while maintaining constant the sum of the percentages by weight of these two oxides, the temperature $T_g$ decreases. For this reason, the magnesia should be introduced in a relatively small quantity, chiefly to maintain the devitrification of the glass within acceptable limits.

In this perspective, the most satisfactory glass compositions are those for which the MgO/CaO ratio remains less than 0.2.

The incorporation of alkaline oxides and iron oxides, the latter in a small quantity, enables the regulation of the viscosity at high temperature without appreciably decreasing the temperature $T_g$.

The preferred content of the glass compositions according to the invention is indicated by the following weight limitations:

| | |
|---|---|
| $SiO_2$ | 38 to 44% |
| $Al_2O_3$ | 17.5 to 22% |
| CaO | 25 to 29% |
| MgO | 0.1 to 5% |
| $Fe_2O_3$ | 0.5 to 2.5% |
| $Na_2O$ | 2 to 6% |
| $K_2O$ | 0.1 to 6% |
| Impurities | <3% |

In this preferred composition, the sum of the silica and alumina content is advantageously maintained between 58 and 62%. In addition to the part played by these oxides, set forth above, this provides improvement of the devitrification characteristics.

Also in this composition, the sum of the earth-alkaline oxides preferably falls within the range of 25 and 32%. Furthermore, the sum of the lime and alumina is preferably maintained between 45 and 50%. These various reductions also enable the devitrification to be reduced by maintaining the high devitrification temperature above 1300° C.

The sum of the alkaline oxide content should be greater than 5%, but preferably less than 11%, which best enables the maintenance of a temperature $T_g$ as high as possible, and the regulation of the temperatures corresponding to the viscosities suitable for the fiberizing.

The influence of the various oxides is established by the various glass compositions given as examples in the Table I herebelow.

The glass fibers according to the invention can be obtained by use of various methods and apparatus known by the man of the art, especially by techniques employing fluid attenuation of glass streams issuing from a multiplicity of orifices. The glass compositions according to the invention are particularly adaptable to the toration technique as described, for example, in U.S. Pat. No. 3,874,886.

The glass compositions according to the invention have transformation temperatures $T_g$ substantially equal to those of the basalt glass compositions, i.e., at least 650° C. Due to this characteristic, the fibers obtained from the glass compositions according to the invention can be utilized for the manufacture of products such as insulation products subjected to temperatures up to about 700° C. without any notable change in their size and shape.

This is demonstrated by one of the methods adapted to test the temperature resistance of fibrous products and to define their area of utilization.

This standardized method (standard DIN 52 271) essentially consists of exerting a given pressure on a fiber blanket presenting a known density, subjecting the assembly to various temperatures, and determining the temperature for which a 5% collapse of the said blanket is observed.

The results, collected in Table II herebelow, were obtained from fibrous blankets having a density of 100 kg/m³, and subjected to a pressure of 981 N/m².

These results show that glass compositions according to the invention, illustrated by Example No. 1, present a remarkable temperature resistance compared to certain known glass compositions (Examples No. 2 to 5), particularly with regard to a basalt-type glass (Example No. 4). The composition of glass of all of these Examples is given in Table I herebelow.

In general, the glass compositions according to the invention enable the attainment of fibrous products of excellent quality suitable for numerous applications, due to their intrinsic properties and also to their adaptation to fiberization by highly effective fiberizing methods and apparatus, such as those cited above. The desirable characteristics of the fibers, referred to above, are also indicated by good resistance to vibrations at high temperature, and, therefore, the fibers provide for production of products having excellent acoustical insulating characteristics at high temperatures.

In the field of industrial thermal insulation, the fibers according to the invention are advantageously used in the form of geometrically well-defined panels, made rigid by a polymerized binder, or in the form of tubular products intended for the insulation of ducts, frequently referred to as casings.

The fibers according to the invention can also be used in the form of blankets sewn on cardboard or metal grating, or in the form of padding, or even in bulk form for infilling cavities.

The fibers according to the invention can enter in the constitution of fire-proof elements like fire walls elements for example.

The fibers according to the invention can also be used in the make-up of dampers placed on and/or inside conduits for fluids transported at high temperature.

In general, the fibers according to the invention advantageously replace a certain number of fibers known in many applications, such as reinforcement agents for semirigid or rigid products, likely to be exposed to high temperature.

EXAMPLES

TABLE I

| OXIDES | Ex. 1 | Ex. 2 | Ex. 3 | Ex. 4 | Ex. 5 | Ex. 6 |
|---|---|---|---|---|---|---|
| $SiO_2$ | 42.3 | 39.4 | 38.0 | 40.7 | 40.1 | 42.4 |
| $Al_2O_3$ | 18.5 | 18.9 | 23.8 | 17.9 | 20.1 | 18.0 |
| CaO | 27.7 | 28.7 | 27.0 | 31.8 | 27.7 | 24.8 |
| MgO | 0.3 | 0.6 | 0.4 | 1.2 | 0.5 | 2.8 |
| $Fe_2O_3$ | 1.7 | 1.9 | 1.7 | 1.9 | 1.8 | 1.6 |
| $Na_2O$ | 4.3 | 4.6 | 3.9 | 2.6 | 4.2 | 3.7 |
| $K_2O$ | 4.3 | 5.0 | 4.3 | 3.1 | 4.8 | 4.7 |
| Impurities | 0.9 | 0.9 | 0.9 | 0.8 | 0.8 | 2.0 |
| $T_g$ | 682 | 682 | 693 | 691 | 681 | 677 |
| Temperature (°C.) corresponding to: | | | | | | |
| 1000 poises | 1143 | 1118 | 1172 | 1126 | 1136 | 1133 |

TABLE I-continued

| OXIDES | Ex. 1 | Ex. 2 | Ex. 3 | Ex. 4 | Ex. 5 | Ex. 6 |
|---|---|---|---|---|---|---|
| 100 poises | 1300 | 1267 | 1324 | 1265 | 1285 | 1300 |
| 50 poises | 1363 | 1329 | 1390 | 1323 | 1348 | 1375 |
| Liquidus (°C.) | 1230 | 1280 | 1330 | 1280 | 1260 | 1240 |
| Maximum speed of growth ($\mu \cdot min^{-1}$) | 13.3 | 29.0 | 31.6 | 33.0 | 20.0 | 29.8 |
| Temperature (°C.) corresponding to the maximum speed | 1150 | 1050 | 1135 | 1115 | 1100 | 1100 |

TABLE II

| OXIDES | No. 1 Glass fiber according to the invention | No. 2 Known glass fiber | No. 3 Rock fiber | No. 4 Basalt fiber | No. 5 Slag fiber |
|---|---|---|---|---|---|
| $SiO_2$ | 42.3 | 64.6 | 47.0 | 45.9 | 41.4 |
| $Al_2O_3$ | 18.5 | 2.9 | 14.6 | 12.9 | 11.7 |
| CaO | 27.7 | 6.5 | 18.4 | 10.5 | 40.6 |
| MgO | 0.3 | 3.0 | 8.5 | 9.3 | 4.0 |
| $Fe_2O_3$ | 1.7 | 0.4 | 6.5 | 12.6 | 0.8 |
| $Na_2O$ | 4.3 | 13.8 | 2.6 | 3.1 | — |
| $K_2O$ | 4.3 | 1.0 | 0.5 | 1.2 | — |
| $TiO_2$ | — | — | 0.6 | 2.8 | — |
| MnO | — | — | — | — | 0.7 |
| $B_2O_3$ | — | 5.0 | — | — | — |
| BaO | — | 2.4 | — | — | — |
| Impurities | 0.9 | 0.4 | 1.3 | 1.7 | 0.8 |
| Temperature of collapse (5%) | 675° C. | 515° C. | 640° C. | 650° C. | 700° C. |

We claim:

1. Glass fiber characterized by a transformation temperature of at least 650° C. and by a liquidus temperature of from about 1230° C. to about 1330° C., and having a composition consisting essentially of the following ingredients in the following percentages by weight:

| $SiO_2$ | 38 to 44% |
|---|---|
| $Al_2O_3$ | 17.5 to 22% |
| CaO | 25 to 29% |
| MgO | 0.1 to 5% |
| $Fe_2O_3$ | 0.5 to 2.5% |
| $Na_2O$ | 2 to 6% |
| $K_2O$ | 0.1 to 6% |
| Impurities | <3% | the sum of the percentages of earth-alkaline oxides being less than or equal to 34%, the sum of $SiO_2+Al_2O_3$ falls within the range of 58 to 62%, and the sum of the alkaline oxides $Na_2O+K_2O$ is greater than 5% and less than or equal to 11%.

2. Glass fiber according to claim 1, characterized in that the sum of $Al_2O_3+CaO$ falls within the range of 45 to 50%.

3. Glass fiber according to claim 1, characterized in that its composition by weight is as follows:

| $SiO_2$ | 42.3% |
|---|---|
| $Al_2O_3$ | 18.5% |
| CaO | 27.7% |
| MgO | 0.3% |
| $Fe_2O_3$ | 1.7% |
| $Na_2O$ | 4.3% |
| $K_2O$ | 4.3% |
| Impurities | 0.9% |

4. Glass fiber according to claim 1, characterized in that its composition by weight is as follows:

| $SiO_2$ | 39.4% |
|---|---|
| $Al_2O_3$ | 18.9% |
| CaO | 28.7% |
| MgO | 0.6% |
| $Fe_2O_3$ | 1.9% |
| $Na_2O$ | 4.6% |
| $K_2O$ | 5.0% |
| Impurities | 0.9% |

* * * * *